United States Patent Office 3,629,211
Patented Dec. 21, 1971

3,629,211
COPOLYMERS OF STYRENE AND PROCESS FOR PREPARATION THEREOF
Meguma Nozaki, Niihama-shi, Japan, assignor to Sumitomo Chemical Co., Ltd., Osaka-shi, Osaka, Japan
No Drawing. Filed June 30, 1970, Ser. No. 51,386
Claims priority, application Japan, June 30, 1969,
44/51,941
Int. Cl. C08f 17/00
U.S. Cl. 260—80.78                                          16 Claims

ABSTRACT OF THE DISCLOSURE

Copolymers of styrene having improved heat resistance and mechanical properties are provided by copolymerizing a styrene monomer with an m-alkyl-α-alkylstyrene and a p-alkyl - α-alkylstyrene. A mixture of a predominantly styrene monomer and another copolymerizable vinyl monomer can also be used in place of the styrene monomer alone. The combined amount of the nuclear-substituted alkyl-α-alkylstyrenes is 100–10, preferably 70–25, parts by weight per 100 parts by weight of the styrene monomer or mixture. The weight ratio of the m-alkyl-α-alkylstyrene to the p-alkyl-α-alkylstyrene ranges from 35:65 to 85:15, preferably from 45:55 to 75:25.

BACKGROUND OF THE INVENTION

Field of the invention

This invention relates to copolymers of styrene having excellent heat resistance and mechanical properties and to a process for the preparation of such copolymers. The copolymer consists of m-alkyl-α-alkylstyrene, a p-alkyl-α-alkylstyrene, and either a styrene monomer or a mixture of a styrene monomer with another copolymerizable vinyl monomer.

Description of prior art

Polystyrene has been used widely as an inexpensive and an easily processable resin, but fabricated articles made therefrom have found somewhat limited applications because of the low heat distortion temperature of polystyrene.

To overcome this serious defect, methods have heretofore been practiced to copolymerize styrene with alkylstyrenes, such as α-alkylstyrenes and p-alkylstyrenes, acrylonitriles, or alkyl methacrylates. Of these comonomers, the alkylstyrenes, especially α-methylstyrene, have preferably been used. This method, however, has a disadvantage when the proportion of α-methylstyrene in the resulting copolymer is suffiicent to contribute to the heat resistance. The mechanical properties of the polystyrene become markedly deteriorated and make it difficult to fabricate the resulting copolymer by injection molding or extrusion molding primarily causing a remarkable decline in impact strength. Hence, this method provides for the improvement of the heat resistance at the cost of the mechanical properties to some degree. As a result of these circumstances, there has been a strong demand for polystyrene resins having improved heat resistance without the sacrifice of mechanical properties.

As the results of the extensive studies on this regard, the present inventor has found a process for producing polystyrene resins having good heat resistance without the sacrifice of mechanical properties.

SUMMARY OF THE INVENTION

The present invention provides a copolymer of styrene having excellent heat resistance and mechanical properties by copolymerizing 100–10 parts by weight of nuclear-substituted alkyl-α-alkylstyrenes consisting of an m-alkyl-α-alkylstyrene and a p-alkyl-α-alkylstyrene at a weight ratio of 35:65 to 85:15, and 100 parts by weight of either a styrene monomer or a mixture of a styrene monomer with another copolymerizable vinyl monomer.

DETAILED DESCRIPTION OF THE INVENTION

The copolymers of styrene obtained in the present invention can be fabricated by the injection and extrusion molding techniques. These fabricated articles have improved heat resistance and good mechanical properties, and are utilized in such various applications as household articles and utensils, and industrial component parts for use in light electricity, automobiles, etc.

The copolymers of styrene obtained in the present invention can be used in blending with other polymers such as polystyrene, acrylonitrile-butadiene-styrene terpolymer, methylmethacrylate-butadiene-styrene terpolymer, polybutadiene, butadiene-styrene copolymer and acrylonitrile-butadiene copolymer.

Examples of the other vinyl monomer copolymerizable with styrene include nuclear-substituted styrenes such as O-chlorostyrene, and vinyl toluene, α-substituted styrenes such as α-methylstyrene, acrylonitrile, methacrylonitrile, alkyl acrylates such as methyl acrylate and ethyl acrylate, and alkyl methacrylates such as methyl methacrylate and ethyl methacrylate.

The m-alkyl-α-alkylstyrene used in the present invention is expressed by the following general formula

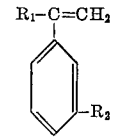

wherein $R_1$ and $R_2$ each represent an alkyl group having 1 to 4 carbon atoms. Specific examples of such a compound are m-methyl - α-methylstyrene, m-ethyl-α-methylstyrene, m-normal-propyl - α-methystyrene, m-isopropyl-α-methylstyrene, m-normal-butyl - α-methylstyrene, m-isobutyl-α-methylstyrene, m-methyl-α-ethylstyrene, m-methyl-α-normal-propylstyrene, m-methyl-α-isopropylstyrene, m-methyl-α-normal-butylstyrene, and m-methyl-α-isobutylstyrene.

The p-alkyl-α-alkylstyrene used in the present invention is a compound expressed by the following general formula

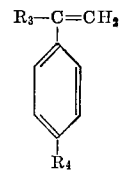

wherein $R_3$ and $R_4$ each represent an alkyl group having 1 to 4 carbon atoms. Specific examples of such a compound are p-methyl-α-methylstyrene,
p-ethyl-α-methylstyrene,
p-normal-propyl-α-methylstyrene,
p-isopropyl-α-methylstyrene,
p-normal-butyl-α-methylstyrene,
p-isobutyl-α-methylstyrene,
p-methyl-α-ethylstyrene,
p-methyl-α-normal-propylstyrene,
p-methyl-α-isopropylstyrene,
p-methyl-α-normal-butylstyrene,
and p-methyl-α-isobutylstyrene.

The amounts of the nuclear-substituted alkyl-α-alkylstyrenes of the above described proportions, which are copolymerized in the present invention with styrene or a mixture predominately of styrene and other vinyl monomer copolymerizable therewith, are 100 to 10 parts by weight per 100 parts by weight of said styrene or styrene mixture. Amounts below 10 parts by weight cannot give copolymers of superior heat resistance, and amounts in excess of 100 parts by weight cause a marked decline in mechanical properties, leading to difficult processing. The preferred range of the amounts of the nuclear-substituted alkyl-α-alkylstyrenes is from 70 parts by weight to 25 parts by weight.

The nuclear-substituted alkyl-α-alkylstyrenes used in the present invention consist of 35–85% by weight of an m-alkyl-α-alkylstyrene and 65–15% by weight of a p-alkyl-α-alkylstyrene. Preferably, the proportion of the m-alkyl-α-alkylstyrene ranges from 45 to 75% by weight, and that of the p-alkyl-α-alkylstyrene, from 55 to 25% by weight. The use of the m-alkyl-α-alkylstyrene in a proportion below 35% by weight is undesirable because the mechanical properties of the resulting copolymer are deteriorated. On the other hand, amounts in excess of 85% by weight result in only a slight improvement in heat resistance of the resulting copolymer.

The polymerization in the present invention can be performed by any method known in the polymerization of styrene, such as bulk, suspension, and emulsion polymerization.

Generally, the polymerization can be carried out at a temperature of 40 to 220° C. It is especially preferred to perform the polymerization by the suspension polymerization method or the bulk polymerization method at a temperature of 70 to 200° C., and by the emulsion polymerization method at a temperature of 40 to 100° C.

The use of polymerization initiators is not particularly necessary, but preferable. Any polymerization initiators known in the polymerization of styrene are used either alone or in mixtures, or in conjunction with a reducing agent such as sodium formaldehyde sulfoxylate and 1-ascorbic acid. The examples are water-soluble peroxides such as hydrogen peroxide, persulfates, organic peroxides such as dilauroyl peroxide, benzoyl peroxide, di-tert-butyl peroxide, and tert-butyl perbenzoate, organic hydroperoxide such as tert-butyl hydroperoxide and cumene hydroperoxide, azo compounds such as azobisisobutyronitrile, and boron compounds.

In the suspension polymerization, dispersing agents such as sodium dodecylbenzenesulfonate and calcium tertiary phosphate are used to advantage, and in the emulsion polymerization, emulsifying agents such as polyvinyl alcohol, sodium alkylbenzenesulfonate and sodium lauryl sulfate are used.

Molecular weight regulating agents such as mercaptans may, if desired, be added during the polymerization.

The present invention will be described further by the following examples which are illustrative and are not intended in any way to limit the invention. All parts in the examples mean parts by weight.

The properties of the copolymers of styrene obtained in the examples were measured by the below-indicated methods.

(1) Heat distortion temperature (° C.): Measured in accordance with ASTM D648–56
(2) Melt index (gr./10 minutes): Measured in accordance with ASTM D1238–62T
(3) Impact strength (kg.-cm./cm.): Measured in accordance with ASTM D256–65D

EXAMPLES 1–3 AND COMPARATIVE EXAMPLES 1–2

A stainless steel autoclave was charged successively with 200 parts of ion-exchanged water, 100 parts of styrene, m-methyl-α-methylstyrene and p-methyl-α-methylstyrene of the amounts indicated in Table 1, 0.15 part of di-tert-butyl peroxide as a polymerization initiator, and 0.1 part of calcium tertiary phosphate and 0.01 part of sodium dodecylbenzenesulfonate as dispersing agents. The atmosphere inside the autoclave was replaced by nitrogen. The materials were stirred to make a dispersion, and the autoclave was heated to 130° C. to initiate the polymerization. The autoclave was maintained at this temperature for 4 hours, heated to 150° C., and maintained at this temperature for one hour to complete the polymerization. After the completion of the polymerization, the autoclave was cooled, and some unreacted monomer was removed by steam stripping. The polymer obtained was washed, dehydrated, dried, shaped into pellets of a suitable size by means of an extruder, and the heat resistance and other properties of the copolymer so obtained were determined. The results are as shown in Table 1.

It is seen from the results shown in Table 1 that the styrene copolymer obtained in Comparative Example 1 in which m-methyl-α-methylstyrene was absent had a high heat distortion temperature, but a bad moldability and a low impact strength. The copolymer obtained in the absence of p-methyl-α-methylstyrene Comparative Example 2 had a low heat distortion temperature. In contrast, the styrene copolymers within the scope of the present invention Examples 1, 2 and 3 had a markedly improved heat distortion temperature, and there was no appreciable decline in moldability and impact strength.

TABLE 1

|  | Comparative Ex. 1 | Ex. 1 | Ex. 2 | Ex. 3 | Comparative Ex. 2 |
|---|---|---|---|---|---|
| Amount of m-methyl-α-methylstyrene (part per 100 parts of styrene) | 0 | 45 | 23 | 28 | 40 |
| Amount of p-methyl-α-methylstyrene (part per 100 parts of styrene) | 40 | 22 | 17 | 12 | 0 |
| Amount of residual monomer in the copolymer obtained (percent by weight) | 0.15 | 0.10 | 0.13 | 0.09 | 0.13 |
| Heat distortion temperature (° C.) | 118 | 115 | 115 | 109 | 96 |
| Melt index (gr./10 min.) | 0.20 | 0.38 | 0.40 | 0.43 | 0.44 |
| Impact strength (kg.-cm./cm.) | 1.0 | 1.4 | 1.7 | 1.6 | 1.7 |
| Moldability: |  |  |  |  |  |
| Injection | Bad | Fair | Good | Good | Good |
| Extrusion | Bad | Fair | Fair | Fair | Fair |

EXAMPLES 4–6 AND COMPARATIVE EXAMPLES 3–4

A stainless steel autoclave was charged successively with 200 parts of ion-exchanged water, 100 parts of styrene, a nuclear-substituted methyl-α-methylstyrene mixture consisting of 65% by weight of m-methyl-α-methylstyrene and 35% by weight of p-methyl-α-methylstyrene of the amount indicated in Table 2, 0.15 part of di-tert-butyl peroxide, 1.0 part of calcium tertiary phosphate, and 0.01 part of sodium dodecylbenzenesulfonate. The polymerization was carried out and the product was treated in accordance with the manner as described in Example 1. The styrene copolymer pellets were obtained, and the heat resistance and other properties of the copolymer pellets were determined. The results are as shown in Table 2.

It is seen from Table 2 that the styrene copolymers within the scope of the present invention Examples 4, 5 and 6 had a markedly improved heat distortion temperature, and there was no appreciable decline in moldability and impact strength.

TABLE 2

|  | Comparative Ex. 1 | Ex. 1 | Ex. 2 | Ex. 3 | Comparative Ex. 2 |
|---|---|---|---|---|---|
| Amount combined of the nuclear-substituted methyl-α-methylstyrenes (part per 100 parts of styrene) | 0 | 25 | 54 | 82 | 150 |
| Amount of residual monomer in the copolymer obtained (percent by weight) | 0.08 | 0.11 | 0.14 | 0.12 | 0.20 |
| Heat distortion temperature (° C.) | 94 | 106 | 110 | 115 | 118 |
| Melt index (gr./10 min.) | 0.41 | 0.42 | 0.44 | 0.39 | 0.22 |
| Impact strength (kg.-cm./cm.) | 1.8 | 1.8 | 1.7 | 1.6 | 1.1 |
| Moldability: |  |  |  |  |  |
| Injection | Good | Good | Good | Good | Fair |
| Extrusion | Fair | Fair | Fair | Fair | Bad |

EXAMPLE 7 AND COMPARATIVE EXAMPLE 5

A glass-lined autoclave was charged successively with 200 parts of ion-exchanged water, 100 parts of styrene, a nuclear-substituted methyl-α-methylstyrene mixture consisting of 65% by weight of a m-methyl-α-methylstyrene and 35% by weight of p-methyl-α-methylstyrene of the amount indicated in Table 3, 0.2 part of tert.-butyl hydroperoxide, and 1.5 parts of sodium lauryl sulfate as dispersing agent. The atmosphere inside the autoclave was, replaced by nitrogen. The materials were stirred to make a dispersion, and the autoclave was heated at 90° C. to initiate the polymerization. The autoclave was maintained at this temperture for 24 hours to complete the polymerization. After the completion of the polymerization, the autoclave was cooled, and some unreacted monomer was removed by steam stripping. The resulted latex was coagulated my hydrogen chloride aqueous solution and the polymer was filtered, washed and dried. The polymer obtained was shaped into pellets of a suitable size by means of an extruder, and the heat resistance and other properties of the copolymer pellets was determined. The results are as shown in Table 3.

TABLE 3

|  | Comparative Example 5 | Example 7 |
|---|---|---|
| Amount combined of the nuclear substituted methyl-α-methylstyrenes (part per 100 parts of styrene) | 0 | 40 |
| Amount of residual monomer in the polymer (percent by weight) | 0.02 | 0.06 |
| Heat distortion temperature (° C.) | 93 | 110 |
| Melt index (g./10 minutes) | 0.44 | 0.40 |
| Impact strength (kg.-cm./cm.) | 1.8 | 1.8 |
| Moldability: | | |
| Injection | Good | Good |
| Extrusion | Fair | Fair |

It is seen from Table 3 that the styrene copolymer within the scope of the present invention (Example 7) had a markedly improved heat distortion temperature, and there was no appreciable decline in moldability and impact strength.

What is claimed is:

1. A copolymer of styrene comprising 100 to 10 parts by weight of nuclear-substituted alkyl-α-alkylstyrenes consisting of an m-alkyl-α-alkylstyrene and a p-alkyl-α-alkylstyrene at a weight ratio of 35:65 to 85:15, and 100 parts by weight of either a styrene monomer or a mixture of a styrene monomer as a predominant constituent and other vinyl monomer copolymerizable therewith.

2. A copolymer according to claim 1 wherein the combined amount of the nuclear-substituted alkyl-α-alkylstyrenes is 70 to 25 parts by weight.

3. A copolymer according to claim 1 wherein the vinyl monomer is selected from the group consisting of acrylonitrile, methacrylate, ethylacrylate and methylacrylate.

4. A copolymer according to claim 1 wherein the weight ratio of the m-alkyl-α-alkylstyrene to the p-alkyl-α-alkylstyrene ranges from 45:55 to 75:25.

5. A copolymer according to claim 1 wherein the alkyl groups of the nuclear-substituted alkyl-α-alkylstyrenes have 1 to 4 carbon atoms.

6. A copolymer according to claim 1 wherein the m-alkyl-α-alkylstyrene is m-methyl-α-methylstyrene.

7. A copolymer according to claim 1 wherein the p-alkyl-α-alkylstyrene is p-methyl-α-methylstyrene.

8. A process for preparing a copolymer of styrene having excellent heat resistance and mechanical properties, which comprises copolymerizing 100 to 10 parts by weight of nuclear-substituted alkyl-α-alkylstyrenes consisting of an m-alkyl-α-alkylstyrene and a p-alkyl-α-alkylstyrene at a weight ratio of 35:65 to 85:15, with 100 parts by weight of a styrene monomer or a mixture of a styrene monomer as a predominant constituent and other vinyl monomer copolymerizable therewith.

9. A process according to claim 8 wherein the combined amount of the nuclear-substituted alkyl-α-alkylstyrenes is 70 to 25 parts by weight.

10. A process according to claim 8 wherein the weight ratio of the m-alkyl-α-alkylstyrene to the p-alkyl-α-alkylstyrene ranges from 45:55 to 75:25.

11. A process according to claim 8 wherein the alkyl groups of the nuclear-substituted alkyl-α-alkylstyrenes have 1 to 4 carbon atoms.

12. A process according to claim 8 wherein the m-alkyl-α-alkylstyrene is m-methyl-α-methylstyrene.

13. A process according to claim 8 wherein the p-alkyl-α-alkylstyrene is p-methyl-α-methylstyrene.

14. A process according to claim 8 wherein the copolymerization is carried out at a temperature of 70° to 200° C. in the presence of a catalyst selected from the group consisting of benzoyl peroxide, di-tert.-butyl peroxide, lauroyl peroxide and tert.-butyl perbenzoate.

15. A process according to claim 8 wherein the copolymerization is carried out in water at a temperature of 70° to 200° C. in the presence of a catalyst selected from the group consisting of benzoyl peroxide, di-tert.-butyl peroxide, lauroyl peroxide and tert. butyl perbenzoate and a dispersing agent selected from the group consisting of sodium dodecylbenzenesulfonate and calcium tertiary phosphate.

16. A process according to claim 8 wherein the copolymerization is carried out in water at a temperature of 40° to 100° C. in the presence of a catalyst selected from the group consisting of hydrogen peroxide, cumene hydroperoxide and tert.-butyl hydroperoxide, a redox system consisting of a mixture of said catalyst and a reducing agent selected from the group consisting of sodium formaldehyde sulfoxylate and 1-ascorbic acid, and an emulsifying agent selected from the group consisting of polyvinyl alcohol, sodium alkylbenzene sulfonate and sodium lauryl sulfate.

References Cited
UNITED STATES PATENTS

| 2,732,371 | 1/1956 | Wehr | 260—93.5 |
| 3,499,877 | 3/1970 | Arnold | 260—80.78 |

JOSEPH L. SCHOFER, Primary Examiner

R. S. BENJAMIN, Assistant Examiner

U.S. Cl. X.R.

260—80.81, 888, 892